United States Patent [19]

Shinozaki et al.

[11] Patent Number: 5,121,250
[45] Date of Patent: Jun. 9, 1992

[54] SECOND-HARMONIC WAVE GENERATING ELEMENT

[75] Inventors: Keisuke Shinozaki; Toshio Nonaka, both of Tokyo, Japan

[73] Assignee: Oki Electric Industry Co., Ltd., Tokyo, Japan

[21] Appl. No.: 645,470

[22] Filed: Jan. 24, 1991

[30] Foreign Application Priority Data

Jan. 25, 1990 [JP] Japan .................................. 2-15220
Feb. 28, 1990 [JP] Japan .................................. 2-48137

[51] Int. Cl.$^5$ .............................................. H03F 7/00
[52] U.S. Cl. ...................................... 359/328; 372/22; 372/96
[58] Field of Search ...................... 359/328; 372/22, 96

[56] References Cited

U.S. PATENT DOCUMENTS 5,036,220 7/1991 Byer et al. ........................... 359/328

OTHER PUBLICATIONS

Japanese Journal of Applied Physics, vol. 6, No. 3, Mar. 1967, pp. 318-327, "Growth Ridges, Etched Hillocks, and Crystal Structure of Lithium Niobate", Niizeki, et al.
Applied Physics Letters, vol. 47 (11) Dec. 1985, pp. 1125-1127, "Current induced periodic ferroelectric domain structure in LiNbO$_3$ applied for efficient nonlinear optical frequency mixing", Feisst, et al.
Applied Physcis Letters, vol. 37 (7), Oct. 1980, pp. 607-609, "Enhancement of second-harmonic generation in LiNbO$_3$ crystals with periodic laminar ferroelectric domains", Feng, et al.
Optics Communications, vol. 6, No. 3, Nov. 1972, pp. 301-304, "Phase Matching By Periodic Modulation of the Nonlinear Optical Properties", Somekh, et al.
Shingaku Giho (Ieice Technical Report), MW 87-113, Feb. 24, 1988, pp. 23-30, "The Angle Phase Matching Type SHG Device using Ti-diffused LiNbO$_3$ Channel Type Waveguide".
Electronics Letters, Feb. 2nd, 1989, vol. 25, No. 3, "Second-Harmonic Generation of Green Light In Periodically Poled Planar Lithium Niobate Waveguide", E. J. Lim et al.
Physical Review, Sep. 15th, 1962, vol. 127, No. 6, "Interactions Between Light Waves In A Nonlinear Dielectric", J. A. Armstrong et al.
IEEE Journal of Quantum Electronics, Jun. 1988, vol. 24, No. 6, "Efficient Second Harmonic Generation of a Diode-Laser-Pumped CW Nd: YAG Laser Using Monolithic MgO: LiNbO$_3$ External Resonant Cavities".

Primary Examiner—James W. Davie
Attorney, Agent, or Firm—Spencer, Frank & Schneider

[57] ABSTRACT

An element for generating second-harmonic waves of a short wavelength from a fundamental wave emitting from a semiconductor laser and the like. The element includes a substrate made of a ferroelectric crystal, a second-harmonic wave generator for generating a second-harmonic wave from a fundamental wave entered therein, and periodically arranged portions formed in a front stage region and a rear stage region of the element. The periodic portions or structures, each have pairs of parts or regions of a high optical refractive index and of a low optical refractive index so as to confine the fundamental waves in the second-harmonic wave generating portion. These regions have various kinds of material diffused or introduced therein and of a thickness. According to another example of the element, the sign of a nonlinear optical coefficient of the region is periodically reversed and the region satisfies a quasi-phase-matching condition.

14 Claims, 4 Drawing Sheets

SECOND-HARMONIC WAVE GENERATING ELEMENT

Field of the Invention

The present invention relates to an element for generating a second-harmonic wave of the fundamental wave entered to the element.

BACKGROUND OF THE INVENTION

Description of the Conventional Techniques

Semiconductor lasers, solid lasers and gas lasers have been known as light sources outputting coherent light beams and are employed in various fields such as a measurement field, a communication field, and the like. Due to a restriction in the material used, the oscillation wavelengths generated by the above lasers are limited. In particular, it has been difficult to obtain light with short wavelength. Consequently, nowadays elements enabling the generation of a second-harmonic wave of the fundamental wave which are generated from the semiconductor laser and the like have been studied. The elements above hereinafter are referred to as a second-harmonic wave generating element or generator.

One example of such a second-harmonic wave generating element is disclosed in an article in Electronics Letters, Vol. 25, No. 3(Feb. 2, 1989) pp 174, 175. This article will be referred to as literature (a). The conventional second-harmonic wave generating element disclosed in literature (a) above has a region formed in a LiNbO$_3$ substrate so as to function as a second-harmonic wave generator. The region has a nonlinear optical coefficient of a sign which is periodically reversed and, its period satisfies a quasi-phase-matching condition. The principle of a second-harmonic wave generation according to the quasi-phase-matching method had been theoretically foretold in an article by J. A. Armstrong et al. in Physical Review, Vol. 127, No. 6, pp. 1918-1932 (1962) prior to the literature (a) above. However, it was not until quite recently that the element was formed practically and a generation of the second-harmonic wave was confirmed as described typically in the literature (a) disclosing a second-harmonic wave generating element. Here, the construction of this second-harmonic wave generating element will be explained in detail with reference to FIG. 1 which is a perspective view depicting schematically the construction of the second-harmonic wave generating element.

The second-harmonic wave generating element uses a changing phenomenon of the sign of a nonlinear optical coefficient of LiNbO$_3$ according to the direction of spontaneous ferroelectric polarization of the crystal. It is noted that the fact of a reversing of the spontaneous ferroelectric polarization of LiNbO$_3$ crystal can occur when titanium (Ti) is diffused in a high temperature atmosphere (for example, about 1000° C.) in the predetermined part of the LiNbO$_3$ crystal has been disclosed in, for example, the literature "Japanese Journal of Applied Physics, Vol.6, No. 3 pp. 318-327 (1967)".

Figure 1:
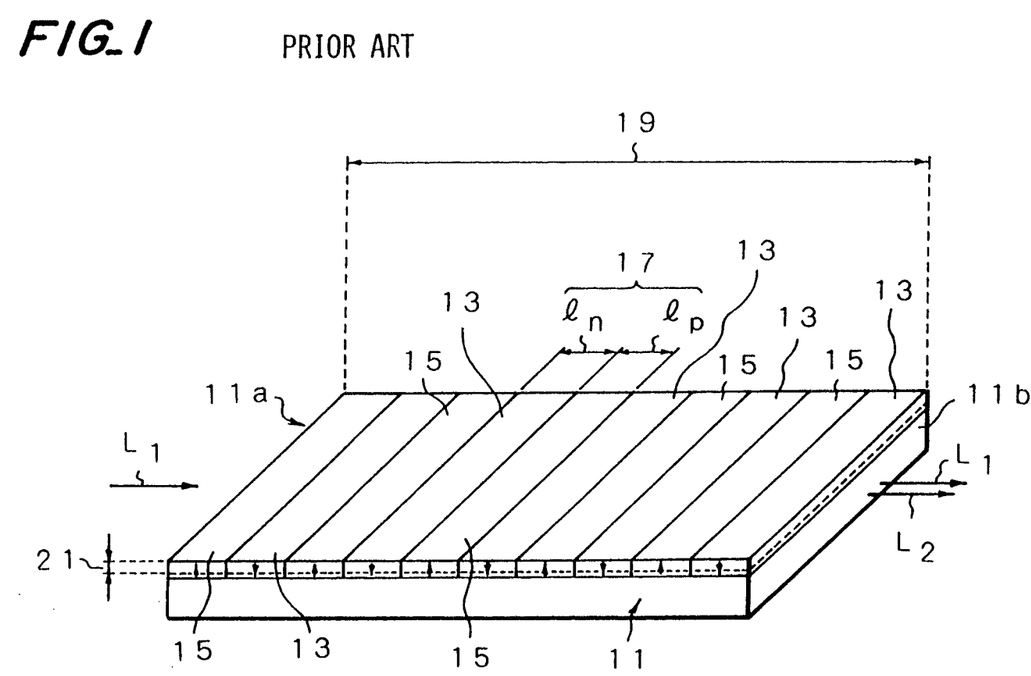
FIG. 1 is a schematic perspective view showing a conventional second-harmonic wave generating element.

In the second-harmonic wave generating element disclosed in literature (a), the direction of the spontaneous ferroelectric polarization is reversed due to a titanium diffusion. Consequently, as shown in FIG. 1, on a +C surface of the LiNbO$_3$ substrate 11 of a thickness 0.5 mm, titanium diffused regions 13 in a shape of stripes are ferroelectrically formed for example. The direction of spontaneous ferroelectric polarization in the striped regions 13, in which titanium is diffused, is reversed by the diffusion of titanium into the downward direction as shown in FIG. 1. On the contrary, the direction of spontaneous ferroelectric polarization in the regions 15, in which titanium is not diffused, remains in its original upward direction. As a result, spontaneous ferroelectric polarization periodic inverted (domain inverted) structures 13 and 15 are formed on the LiNbO$_3$ substrate, resulting in a construction of a region 19 (hereinafter it may be referred to as a domain inverted region 19) in which the sign of a nonlinear optical coefficient is periodically reversed. The width of the regions 13 having titanium diffused and the width of the other regions 15 provided with no titanium dispersed or diffused are shown respectively by $l_n$ and $l_p$. The coherence length of the fundamental waves is represented by $l_c$. The quasi-phase-matching condition will be satisfied when the total periods $l_n$ and $l_p$ of the periodic structure 17 satisfy the following equation (1).

$$l_n = l_p = (2m+1)l_c \tag{1}$$

Consequently, it is preferable to form the periodic structure so as to make the number of periods of an odd number of the coherence length $l_c$. The symbol m in the equation (1) above is zero or a positive integer. It is known that the coherence length $l_c$ is determined by the following equation (2) in, for example, the literature of Applied Physics Letters, Vol.47 (1985) pp 1125-1127.

$$l_c = \frac{\lambda}{4(n(2\omega) - n(\omega))} \tag{2}$$

Wherein, $\lambda$ is a wavelength of the fundamental wave in a vacuum, $n(2\omega)$ is a refractive index of the LiNbO$_3$ substrate relating to the second-harmonic wave, and $n(\omega)$ is a refractive index of the LiNbO$_3$ substrate with reference to the fundamental wave.

Some examples of the concrete values of the coherence length $l_c$ are shown in the literature of Applied Physics Letters Vol.37 (1980) pp 607-609; when LiNbO$_3$ is used and $\lambda=1.06$ μm, $l_c=3.4$ μm.

According to the literature (a) above, on the LiNbO$_3$ substrate 11 of the second-harmonic wave generating element disclosed in the literature (a), an optical waveguide or wave-guiding route 21 (shown in FIG. 1 by a dashed-line) having a thickness substantially equal to that of the domain inverted region 19 is formed by a proton exchange method after the domain inverted region 19 is provided.

When a fundamental wave L$_1$ is entered into a second-harmonic wave generating element according to the prior art through an end 11a, for example, shown in FIG. 1 as being perpendicular to the stripe direction of the striped region 13 of the domain inverted region 19, the fundamental wave L$_1$ and the second-harmonic wave L$_2$ of the fundamental wave emit through another end 11b on the emitting side of the element.

In addition, it was possible to enter a fundamental wave having of wavelength 1.06 μm at 1 mW power through the optical waveguide 21, resulting in obtaining a second-harmonic wave with a wavelength of 532 nm of blue at 0.5 nW power.

However, according to the conventional second-harmonic wave generating element described and shown in FIG. 1, it is apparent that despite the incident fundamental wave of 1 mW power, the resulting second-harmonic wave has only 0.5 nW power as described above That is, the conversion efficiency (power of second-harmonic wave/power of incident fundamental wave) was merely or so low as $0.5 \times 10^{-6} = 0.5$ nW/1 mW.

Further, considering coupling efficiency between the second-harmonic wave generating element and a light source (for example, laser means) supplying a fundamental wave to the element, the light power must emit a fundamental wave of a power higher than the power to be given to the emitting second-harmonic wave generating element. Consequently, the conversion efficiency between the power of the fundamental wave when emitted from the light source and another power of the second-harmonic wave emitted from the second-harmonic wave generating element becomes smaller than the conversion efficiency previously mentioned. As a result, the practical value of the second-harmonic wave generating element of the prior art decreases when it is used as a blue light emitting element.

SUMMARY OF THE INVENTION

The present invention has been developed to overcome the shortcomings of the prior art set forth above. Accordingly, it is an object of the present invention, as readily understood from the above description, to provide a second-harmonic wave generating element or device which enables the conversion efficiency of a power of the fundamental wave to a power of the second-harmonic wave to exceedingly improve.

In order to attain the object of the present invention, the present invention provides a second-harmonic wave generating element comprising a substrate of ferroelectric crystal, a second-harmonic wave generating portion generating a second-harmonic wave of the incident fundamental wave, and periodic structures respectively formed on a front stage region of the substrate, the front stage region being at the side of the substrate in which the fundamental wave from the second-harmonic wave generating portion enters, and on a rear stage region of the substrate, the rear stage region being at another side of the substrate from which the second-harmonic wave emits, the periodic structures being provided with first parts of a high optical refractive index and second parts of a low optical refractive index, these first and second parts being reciprocally and periodically arranged so as to confine the fundamental wave in the second-harmonic wave generating portion.

In an embodiment of the present invention, it is preferable that the high optical refractive index portion is constituted by a region formed by an introduction of a different kind of material into the ferroelectric crystal. A period $\Lambda_i$ of the periodic structure of the refractive index, which structure is placed at the front stage of the second-harmonic wave generating portion, has a value satisfying the following equation (3). A period $\Lambda_o$ of the periodic structure of the reflective index, which structure is placed at the rear stage of the second-harmonic wave generating portion, has a value satisfying the following equation (4), $$\left. \begin{array}{rl} \Lambda_i &= \frac{1}{2} \frac{\lambda}{n(\omega)} (k_1 + 1) \\ &= \frac{1}{2} \frac{\lambda}{2n(2\omega)} (k_2 + 1) \end{array} \right\} \quad (3)$$

$$\left. \begin{array}{rl} \Lambda_o &= \frac{1}{2} \frac{\lambda}{n(\omega)} (m_1 + 1) \\ &= \frac{1}{2} \frac{\lambda}{4n(2\omega)} (2m_2 + 1) \end{array} \right\} \quad (4)$$

Wherein, $\lambda$ represents a wavelength of the fundamental wave in vacuum; $k_1$, $k_2$, $m_1$ and $m_2$, respectively represent zero or a positive integer; $n(\omega)$ represents a refractive index of the periodic structure having the ferroelectric crystal refractive index with reference to the fundamental wave; and $n(2\omega)$ represents a refractive index of the periodic structure having the ferroelectric crystal refractive index with reference to the second-harmonic wave.

Also, it is preferable that the periodic structure of the particular refractive index is constituted by an optical waveguide provided with first and second regions. Each first region is formed by an introduction of a different kind of material of a thickness $d_1$ onto the ferroelectric crystal and each second region is formed by an introduction of the different kind of material of a thickness $d_2$ ($d_1 > d_2$) onto the ferroelectric crystal. the regions and other regions are repeatedly and periodically arranged so that the period $\Lambda_i$ of the periodic structure of the refractive index at the front stage side of the second-harmonic wave generating portion has a value satisfying the following equation (A), and the period $\Lambda_o$ of the periodic structure of the refractive index at the rear stage side of the second-harmonic wave generating portion has a value satisfying the following equation (B), $$\left. \begin{array}{rl} \Lambda_i &= \frac{\lambda(k_1 + 1)}{(n(\omega)\text{eff}(d_1) + n(\omega)\text{eff}(d_2))} \\ &= \frac{1}{2} \frac{\lambda(k_2 + 1)}{(n(2\omega)\text{eff}(d_1) + n(2\omega)\text{eff}(d_2))} \end{array} \right\} \quad (A)$$

$$\left. \begin{array}{rl} \Lambda_o &= \frac{\lambda(m_1 + 1)}{(n(\omega)\text{eff}(d_1) + n(\omega)\text{eff}(d_2))} \\ &= \frac{1}{4} \frac{\lambda(2m_2 + 1)}{(n(2\omega)\text{eff}(d_1) + n(2\omega)\text{eff}(d_2))} \end{array} \right\} \quad (B)$$

Wherein, $\lambda$ is a wavelength of the fundamental waves in a vacuum; $k_1$, $k_2$, $m_1$ and $m_2$, respectively are zero or a positive integer; $n(\omega)\text{eff}(d_1)$ is an effective refractive index, with reference to the fundamental wave, of a region of a thickness $d_1$ of the periodic structure having a ferroelectric crystal; $n(\omega)\text{eff}(d_2)$ is an effective refractive index, with reference to the fundamental wave, of a region of a thickness $d_2$ of the periodic structure of the ferroelectric crystal; $n(2\omega)$ eff$(d_1)$ is an effective refractive index, concerning the second-harmonic wave, of a region of a thickness $d_1$ of the periodic structure of the ferroelectric crystal; and $n(2\omega)$ eff$(d_2)$ is an effective refractive index, with reference to the second-harmonic wave of a region of a thickness $d_2$ of the periodic structure of the ferroelectric crystal.

Some examples of introducing foreign and different kinds of material into the ferroelectric crystal are thermal dispersive introduction of titanium of the different kinds of material into $LiNbO_3$ and a proton-exchange introduction of proton ($H^+$) of the foreign material into $LiNbO_3$.

Furthermore, in an embodiment of the present invention, the second-harmonic wave generating portion is preferably constituted by a region formed on the ferroelectric crystal, which region having a periodically reversed sign of a nonlinear optical coefficient and satisfying a quasi-phase-matching condition.

According to the second-harmonic wave generating element, the front stage and the rear stage of the second-harmonic wave generating element, respectively have a periodic structure of the refractive index thereon for confining the fundamental wave in the second-harmonic wave generator, so it is possible to confine the fundamental wave within the second-harmonic wave generating portion. It is known from, for example, "Optics Communications, Vol.6 No. 3 (1972) pp 301-304", that the conversion efficiency from the fundamental wave to the second-harmonic wave is proportional to the energy density of the fundamental wave emitted from the second-harmonic wave generating portion. Consequently, when the fundamental wave can be confined to the second-harmonic wave generating portion as described above, it is possible to improve or raise the energy density of the fundamental wave at the second-harmonic wave generating portion, resulting in an improvement of the conversion efficiency from the fundamental wave to the second-harmonic wave.

For example, in a situation where the period $\Lambda_i$ of the periodic structure of the refractive index at the front stage of the second-harmonic wave generating portion has a value satisfying either equation (3) or (A) above, the periodic structure of the refractive index has periods of an integer multiple of a half of the fundamental wavelength, or an integer multiple of a half of the wavelength of second-harmonic wave.

As a result, the periodic structure of the front stage refractive index depicts a high refractive condition of both the fundamental wave and the second-harmonic wave. Consequently, it is possible to prevent the fundamental wave after it enters the second-harmonic wave generating portion from emitting from the front stage side, and also to prevent the second-harmonic wave after it is generated in the second-harmonic wave generating portion from emitting from the front stage side.

In other words, it is possible to effectively confine the fundamental wave and the second-harmonic wave within the front stage of the second-harmonic wave generating portion of the element according to the present invention.

Further, when the period $\Lambda_o$ of the periodic structure of the refractive index previously mentioned provided at the rear stage of the second.-harmonic wave generating portion satisfies either equation (4) or (B) above, the periodic structure of the particular refractive index has periods of an integer multiple of a half of the wavelength of the fundamental wave or of time of an odd number multiple of a quarter of the wavelength of the second-harmonic wave. Due to the fact or characteristic above of the second-harmonic wave generating element of the present invention, the periodic structure of the rear stage refractive index shows a high refractive condition of the fundamental wave and a low refractive condition of the second-harmonic wave. As a result, it is possible to prevent the fundamental wave entered into the second-harmonic wave generating portion from exiting the rear stage side of the portion and to make the second-harmonic wave generated in the second-harmonic wave generating portion effectively emit from the rear stage of the portion.

As a result, it is possible to confine the fundamental wave in the second-harmonic wave generating portion and effectively make the second-harmonic wave exit the rear stage.

BRIEF DESCRIPTION OF THE DRAWINGS

The foregoing and other objects, features and advantages of the present invention will be better understood from the following description taken in connection with the accompanying drawings, in which.

PREFERRED EMBODIMENT OF THE INVENTION

The preferred embodiments of the present invention will be explained with reference to the accompanying drawings. In the figures, the shapes and sizes of constituents as well as the positional relationships therebetween are drawn schematically to facilitate the understanding of the present invention. The following examples are merely suitable cases, and hence should not be construed as limiting the scope of the present invention.

FIRST EMBODIMENT

Figure 2:
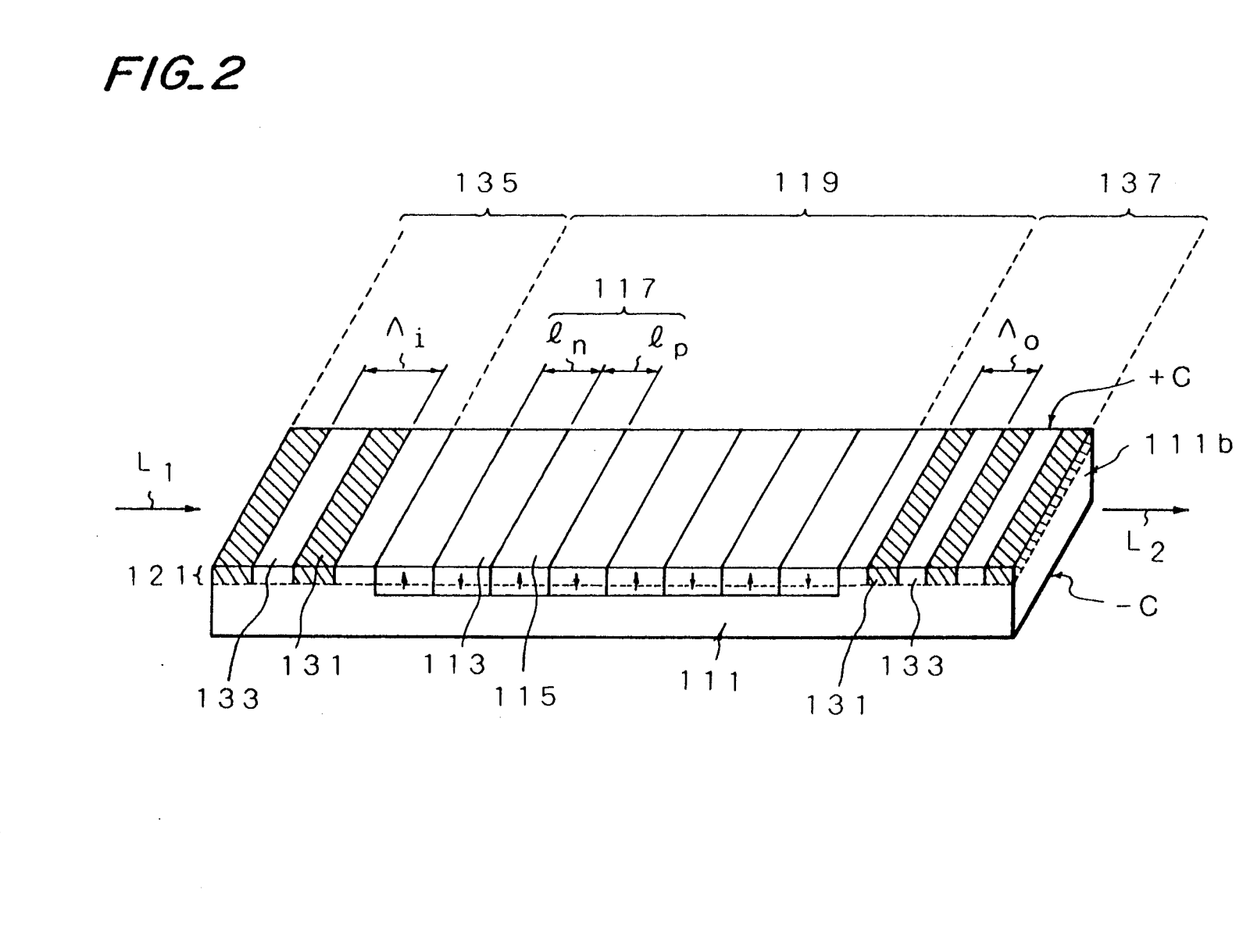
FIG. 2 is a diagrammatic perspective view illustrating a second-harmonic wave generating element according to the present invention.

First, the second-harmonic wave generating element according to the present invention will be described with reference to FIG. 2. FIG. 2 is a schematic illustration showing briefly and perspectively a second-harmonic wave generating element according to the invention.

The second-harmonic wave generating element of the first embodiment uses a $LiNbO_3$ substrate 111 of a ferroelectric crystal.

The $LiNbO_3$ substrate 111 is provided with a region 119 similar to the region (domain inverted region 19 in FIG. 1) with a periodically reversing sign of a nonlinear optical coefficient, as described above, and functioning as a second-harmonic wave generator which generates a second-harmonic wave of an incident fundamental wave.

Further, the substrate 111 has periodic or repeated structures 135 and 137, respectively having alternately and periodically arranged portions 131 of a high optical refractive index and other portions 133 of a low optical refractive index. The periodic structure 135 is formed in a front stage region to which region the fundamental wave of the domain inverted region 119 incidents and the periodic structure 137 in a rear stage region from which region the second-harmonic wave is output. The periodic structure 135 of a particular refractive index to be formed in the front region of the domain inverted region 119 may be conveniently referred to as a periodic structure of a front stage refractive index or a front-periodic structure, and the other periodic structure 137 of another refractive index situated on the rear region of the domain inverted region 119 may be conveniently referred to as a periodic structure of a rear stage refractive index or a rear-periodic structure.

In addition, according to the second-harmonic wave generating element of this embodiment, the optical waveguide which is similar to the conventional optical waveguide 21 (FIG. 1) is formed not only in the domain inverted region 119, but also in the surface regions in which the front-and rear-periodic structures 135 and 137 are formed in the front stage and the rear stage regions of the LiNbO₃ substrate 111, respectively.

It is noted that the high optical refractive index portions 131 and the low optical refractive index portions 133 may be formed by using the suitable conventional method. For example, titanium (Ti) of a foreign material of a different kind is introduced by a thermal diffusion into such region of the LiNbO₃ substrate 111 so that a high optical refractive index is expected to be formed, thereby making a difference in refractive indexes between a Ti-diffused region and a Ti-non-diffused region. The condition of the formation of the above-mentioned titanium diffusion concentration is different from that of the formation of the domain inverted region 119. It is preferable that both the high optical refractive index portion 131 and the low optical refractive index portion 133 are identical with each other in width, and the change or inclination of the refractive index between the portions 131 and 133 is gentle.

Next, one period $\Lambda_i$ consists of a single high optical refractive index portion 131 and a single low optical refractive index portion 133, respectively of the front-periodic structure 135. Here, a value of the period $\Lambda_i$ satisfies the following equation (3). Also, another period $\Lambda_o$ consists of a single high optical refractive index portion 131 and a single low optical refractive index portion 133, respectively of the rear-periodic structure 137 A value of the period $\Lambda_o$ above satisfies the following equation (4).

$$\Lambda_i = \frac{1}{2} \frac{\lambda}{n(\omega)} (k_1 + 1)$$
$$= \frac{1}{2} \frac{\lambda}{2n(2\omega)} (k_2 + 1) \quad (3)$$

$$\Lambda_o = \frac{1}{2} \frac{\lambda}{n(\omega)} (m_1 + 1)$$
$$= \frac{1}{2} \frac{\lambda}{4n(2\omega)} (2m_2 + 1) \quad (4)$$

Wherein, in both the equations, $\lambda$ is the wavelength of the fundamental wave in a vacuum; $k_1$, $k_2$, $m_1$ and $m_2$, respectively represent zero or positive integers; $n(\omega)$ is a refractive index with respect to the fundamental wave; and $n(2\omega)$ is a refractive index of the periodic structure with respect to the second-harmonic wave.

$n(\omega)$ and $n(2\omega)$ in this embodiment are supposed to be as shown below.
$n(\omega) = 2.1520$
$n(2\omega) = 2.2340$ The respective values of the period $\Lambda_i$ appropriate to the fundamental wave and the second-harmonic wave were studied according to the equation (3) above while using $\lambda = 1.06$ μm, $n(\omega) = 2.1520$, and $n(2\omega) = 2.2340$ and $k_1$ and $k_2$ of varying parameters. The resultant values of the study are shown in Table 1 below.

TABLE 1

| $\Lambda_1$ for fundamental waves | | $\Lambda_i$ for harmonic waves | |
|---|---|---|---|
| $k_1$ | $\lambda(k_1 + 1)/2n(\omega)$ | $k_2$ | $\lambda(k_2 + 1)/4n(2\omega)$ |
| 0 | 0.2463 | 0 | 0.1186 |
| | | 1 | 0.2372 |
| | | 2 | 0.3559 |

TABLE 1-continued

| $\Lambda_1$ for fundamental waves | | $\Lambda_i$ for harmonic waves | |
|---|---|---|---|
| $k_1$ | $\lambda(k_1 + 1)/2n(\omega)$ | $k_2$ | $\lambda(k_2 + 1)/4n(2\omega)$ |
| 1 | 0.4926 | 3 | 0.4745 |
| | | 4 | 0.5931 |
| 2 | 0.7388 | 5 | 0.7117 |
| | | 6 | 0.8303 |
| 3 | 0.9851 | 7 | 0.9490 |
| | | 8 | 1.0676 |
| 4 | 1.2314 | 9 | 1.1862 |
| | | 10 | 1.3048 |
| . | | . | |
| . | | . | |
| . | | . | |

It is noted that the harmonic waves in Table 1 represent the second-harmonic waves.

As apparent from Table 1, it is the case of $(k_1, k_2)$ (0, 1), (1, 3), (2, 5), (3, 7) and etc. that these values of the period $\Lambda_i$ for fundamental waves and the other period $\Lambda_i$ for second-harmonic waves are made substantially equal to each other (the difference between both these values being limited to several %). Accordingly, when one of the pairs of $(k_1, k_2)$ above is selected in order to set a particular period $\Lambda_i$, the front-periodic structure 135 generates a period multiplied by an integer, which period is a half of respective wavelengths of the fundamental wave and the second-harmonic waves. In consequence, the front-periodic structure 135 has a characteristic or property of high reflection to the fundamental waves and the second-harmonic waves. As a result, it is difficult for the second-harmonic waves generated in the domain inverted region 119 and the fundamental waves incident to the domain inverted region 119 to come out through the incident side of the fundamental waves of the domain inverted region 119. Anyway, the selection of the pairs of $(k_1, k_2)$ above is done according to the design such as the dimensions of the second-harmonic wave generating element. Further, the number of the periods each consisting of the portion 131 of a high refractive index and another portion 133 of a low refractive index may preferably be determined according to the design of the generating element of the present invention.

While, supposing that $\lambda$ is 1.06 μm, $n(\omega)$ and $n(2\omega)$ are these figures mentioned above, the period $\Lambda_o$ appropriate to the fundamental waves and the second-harmonic waves is examined with $m_1$ and $m_2$ of parameters. The resultant values of the study calculations are shown in Table 2 below.

TABLE 2

| $\Lambda_o$ for fundamental waves | | $\Lambda_o$ for harmonic waves | |
|---|---|---|---|
| $m_1$ | $\lambda(m_1 + 1)/2n(\omega)$ | $m_2$ | $\lambda(2m_2 + 1)/8n(2\omega)$ |
| | | 0 | 0.0593 |
| 0 | 0.2463 | 1 | 0.1779 |
| | | 2 | 0.2966 |
| 1 | 0.4926 | 3 | 0.4152 |
| | | 4 | 0.5338 |
| 2 | 0.7388 | 5 | 0.6524 |
| | | 6 | 0.7710 |
| 3 | 0.9851 | 7 | 0.8897 |
| | | 8 | 1.0083 |
| . | . | 9 | . |
| | | 10 | |
| . | | . | . |
| . | | . | . |

It is noted that the harmonic waves described in Table 2 are the second-harmonic waves.

It is apparent from Table 2 that when $(m_1, m_2)$ (2, 6), (3, 8) ... the values of the period $\Lambda_o$ for fundamental waves and of their period $\Lambda_o$ for the second-harmonic waves are made substantially equal to each other (the difference between both these values being limited to several %). Consequently, when anyone of the pairs of ($m_1$, $m_2$) above is selected and the period $\Lambda_o$ is set, the periodic structure 137 of the rear stage refractive index generates a period multiplied by an integer and a half of the wavelength of the fundamental waves and multiplied by an odd number and a quarter of the wavelength of the second-harmonic waves. Consequently, the rear-periodic structure 137 has a high reflective characteristic or property for the fundamental waves and a low reflective characteristic or property for the second-harmonic waves. As a result, the fundamental waves incident to the domain inverted region 119 are apt to be difficult to emit through the emitting side of the region The second-harmonic waves generated in the domain inverted region 119 easily to emit through the emitting side of the region 119. Considering, for example the dimensions of the second-harmonic waves generating element, it is preferable to select one of the pairs of ($m_1$, $m_2$) above according to the particular design of the element. In addition, the number of the periods, respectively consisting of the high refractive index portion 131 and the low refractive index portion 133 may be appropriately determined according to the design.

When the periods $\Lambda_i$ and $\Lambda_o$ are set as mentioned above, the fundamental waves $L_1$ are restricted or confined in the domain inverted region 119 after passing through the periodic structure 135 having the front stage 26 refractive index. The second-harmonic waves $L_2$ generated in the domain inverted region 119 can be effectively emitted out the other (end of the emitting side) 111b (FIG. 2) of the second-harmonic wave generating element.

SECOND EMBODIMENT

Figure 3A:
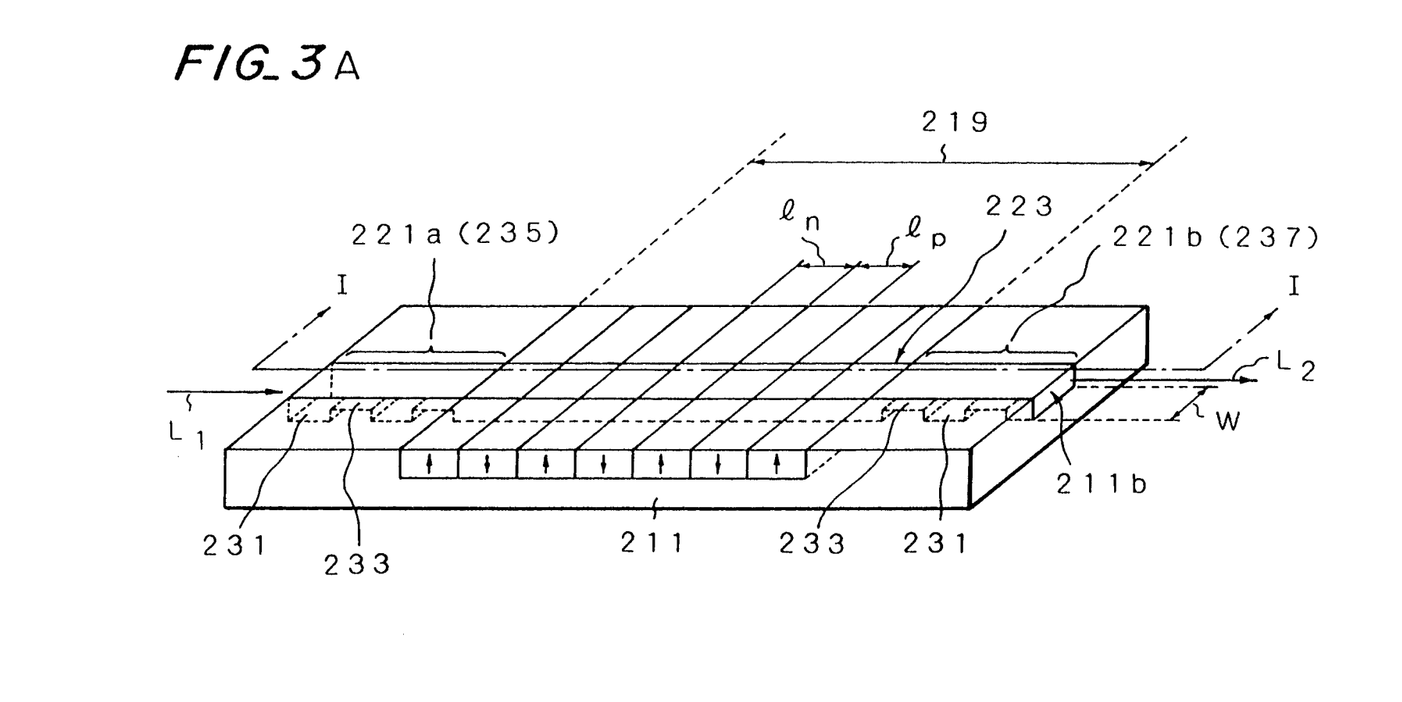
FIGS. 3A and 3B are a schematic perspective view and a section the second-harmonic wave generating element of the present invention, respectively.
Figure 3B:
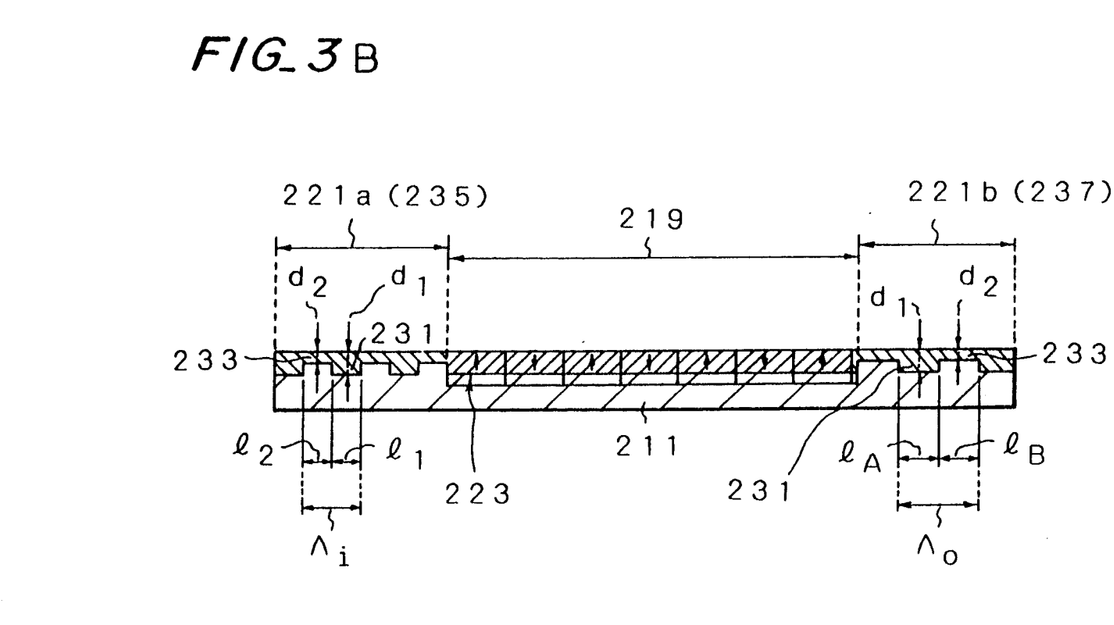

Another second-harmonic wave generating element according to the second embodiment of the present invention will be explained with reference to FIGS. 3A and 3B. FIG. 3A is a perspective view schematically showing the second-harmonic wave generating element of the second embodiment and FIG. 3B is a diagram showing a section taken along the line I—I in FIG. 3A to show the second-harmonic wave generating element above. The second-harmonic wave generating element of the second embodiment includes a periodic structure 235 having the refractive index of the front stage second-harmonic wave generating portion 219, and another periodic structure 237 of a particular refractive index of the rear stage second-harmonic wave generating portion 219. These periodic structures 235 and 237, are respectively provided with optical waveguides 221a and 221b (these waveguides may be identified together by 221). These optical waveguides 221a and 221b, respectively have regions of a thickness $d_1$ formed in the LiNbO$_3$ substrate 211 and other regions of a thickness $d_2$ formed in the substrate 211. The former regions are formed by an introduction of a different kind of material into a region with a depth $d_1$ and the latter regions are formed by an introduction of a different kind of material into a region with a depth $d_2$ (which is smaller than $d_1$). These two types of regions are arranged alternately or periodically along the light transmitting or propagating direction.

According to the construction of such an optical waveguide 221, periodic distribution of the effective refractive index is obtained in the regions due to a difference between these regions of different types and depths $d_1$ and $d_2$. The optical waveguide 221 constructs a periodic structure of a refractive index, which structure provides periodically arranged high optical refractive index portions and low optical refractive index portions according to the present invention. Between the optical waveguides 221a and 221b, respectively constituting periodic structures 235 and 237 of the front stage refractive index and of the rear stage refractive index, there is the domain inverted region 219. In the domain inverted region 219, there is formed an optical waveguide 223 of a thickness $d_1$ arranged in contact with the former-optical waveguide 221a and the rear-optical waveguide 221b through their respective facing ends. The widths of the optical waveguides 221 and 223 are identified as "W".

It is noted that the optical waveguide 221a is made such that the period $\Lambda_i$ satisfies the equation (A) above, the period $\Lambda_i$ being contained in the waveguide 221a and determined by the sum of the length $l_1$ of the region having a thickness $d_1$ and the length $l_2$ of the region having other thickness $d_2$. Also, the period $\Lambda_o$ determined by the sum of the length $l_A$ of the region having a thickness $d_1$ and the length $l_B$ of the region having a thickness $d_2$ satisfies the equation (B) above.

Here, an example of designing these optical waveguides 221 (221a and 221b) will be described. It is supposed that the wavelength $\lambda$ of the fundamental waves is 830 nm, and the wavelength $\lambda(2\omega)$ of the second-harmonic waves is 415 nm, and the optical waveguide 221 is made by Li$^+$—H$^+$ exchange (hereinafter referred to as a proton-exchange) method.

An effective refractive index is determined by the conditions of a thickness of the optical waveguide 221, a refractive index of the waveguide 221 and the media (LiNbO$_3$ and air) surrounding the optical waveguide 221.

Here, a refractive index of a proton-exchange portion (a part of the optical waveguide 221) with reference to the fundamental waves $\lambda$ is $n_1(\omega)$, another refractive index of a portion-exchange portion with reference to the second-harmonic waves is $n_1(2\omega)$, still another refractive index of the LiNbO$_3$ substrate 211 concerning the fundamental waves $\lambda$ is $n_2(\omega)$, and still another refractive index of the LiNbO$_3$ substrate 211 with reference to the second-harmonic waves is $n_2(2\omega)$. According to experiments carried out on the element of the present invention, these refractive indexes have their values as shown below.

| | | |
|---|---|---|
| $n_1(\omega)$ | = | 2.30 |
| $n_1(2\omega)$ | = | 2.41 |
| $n_2(\omega)$ | = | 2.18 |
| $n_2(2\omega)$ | = | 2.27 |

Further, when $d_1 = 1$ μm and $d_2 = 0.7$ μm, respective refractive indexes of the region of the thickness $d_1$ and then region of the thickness $d_2$, respectively with reference to the fundamental waves ($\lambda = 830$ nm) and the second-harmonic waves are determined as shown below by a calculation using an effective refractive index method.

An effective refractive index of the region of a thickness $d_1$ with reference to the fundamental waves is $n(\omega)\text{eff}(d_1) = 2.295$.

An effective refractive index of the region of a thickness $d_2$ concerning the fundamental waves is $n(\omega)\text{eff}(d_2) = 2.291$.

An effective refractive index of the region of a thickness $d_1$ with reference to the second-harmonic waves is $n(2\omega)\text{eff}(d_1) = 2.409$.

An effective refractive index of the region of a thickness $d_2$ with reference to the second-harmonic waves is $n(2\omega)\text{eff}(d_2) = 2.408$.

The value of the period $\Lambda_i$ given from the equation (A) above with the conditions described above, which value being suitable to effectively satisfy both the fundamental waves and the second-harmonic waves has been determined with the parameters of $k_1$ and $k_2$.

According to the result, when for example $(K_1, k_2) = (8, 18)$, it is found that both the period $\Lambda_i$ for the fundamental waves and another period $\Lambda_i$ for the second-harmonic waves have the substantial same value of about 1.63 μm. Consequently, the periodic structure 235 of the front stage side refractive index is constructed with the optical waveguide 221a having the period $\Lambda_i$ of 1.63 μm, by which the second-harmonic waves generated in the domain inverted region 219 and the fundamental waves entered into the region 219 become difficult to emit from the incident side of the fundamental waves on the domain inverted region 219.

The suitable values of the period $\Lambda_o$ given from the equation (B) above substantially satisfying both the fundamental waves and the second-harmonic waves have been tried to determine with parameters of $m_1$ and $m_2$.

As a result, for example, supposing that $(m_1, m_2) = (4, 10)$, it is found that the period $\Lambda_o$ for the fundamental waves and another period $\Lambda_o$ for the second-harmonic waves are values of around 0.904 which are substantially equal to each other. Consequently, constructing the rear periodic structure 237 with the optical waveguide 221b having a period of 0.904 μm makes the fundamental waves entered to the domain inverted region 219 difficult to emit from the emitting side of the region 219 and the second-harmonic waves generated from the domain inverted region 219 easy to emit from the emitting side of the region 219.

When the periods $\Lambda_i$ and $\Lambda_o$ are set as described above, the fundamental waves $L_1$ is confined in the domain inverted region 219 after passing through the periodic structure 235 of the front stage refractive index. The second-harmonic waves $L_2$ generated in the domain inverted region 219 can be efficiently taken out of the corresponding second-harmonic waves generating element through its other end (emitting side end, FIG. 2) 211b.

It is noted that in the second embodiment, respective $(k_1, k_2)$ and $(m_1, m_2)$ have values other than those shown above, which are similar to that of the first embodiment. In consequence, what pair is selected from the paired values of $(k_1, k_2)$ and what pair is selected from the paired values of $(m_1, m_2)$ are solved according to the design consideration, for example, the dimensions and sizes of the second-harmonic wave generating element. Also, the number of the combinations of the portions 221a having a thickness $d_1$ and the portions 221b having a thickness $d_2$ may appropriately be determined according to the design of the element of the present invention.

While preferred embodiments of the second-harmonic wave generating element according to the present invention have been explained, it is to be understood that other forms might be adopted.

Although the second-harmonic wave generating portions in respective embodiments were constructed by the domain inverted regions according to a quasi-phase-matching method, the present invention can be adopted to the element for generating the second-harmonic wave according to the principle other than the quasi-phase-matching method. For example, when the second-harmonic wave generating portion of the element uses refractive index distribution of such an optical waveguide as disclosed in the literature, on p 26 (Shingaku Giho MW-87-113, pp 23–30), it is possible to adopt the invention to the particular second-harmonic wave generating portion.

Also, according to the first embodiment described above in detail, the second-harmonic wave generating element of a particular refractive index has periodic structures at both ends of the incident side of the fundamental waves of the element and of the emitting side of the element, however it is possible to mount optical waveguide(s) at one or both of the outsides of the refractive index periodic structures along a propagation direction of the laser beam.

As apparent from the description above, according to the second-harmonic wave generating element of the present invention, refractive index periodic structures are provided which have a second-harmonic wave generating portion, as well as portions of a high optical refractive index and other portions of a low optical refractive index, respectively arranged periodically or repeatedly at the front stage and the rear stage of the second-harmonic wave generating portion, by which it is possible to confine the fundamental waves entered or incident to the second-harmonic wave generating element within the second-harmonic wave generating portion. As a result, energy concentration of the fundamental waves in the second-harmonic wave generating portion is improved (see literature IEEE JOURNAL OF QUANTUM ELECTRONICS, Vol. 24, No. 6, 1988, pp 913–919), so that the conversion efficiency between the fundamental waves and the second-harmonic waves is increased compared to that of the conventional generating element provided with no periodic structure.

In addition, according to the present invention, the second-harmonic waves can be generated or taken out of the second-harmonic wave generating portion through the periodic structure of a refractive index provided in the portion, by which it is possible to make the second-harmonic waves emit from the emitting side of the element at an efficiency higher than that of the conventional construction in which the second-harmonic wave generating portion comes in direct contact with air.

In conclusion, the present invention provides the second-harmonic wave generating element through which the fundamental waves can be converted to the second-harmonic waves at a higher efficiency than that of the conventional one.

What is claimed is:

1. A second-harmonic wave generating element, comprising:

a ferroelectric crystal substrate having an input portion for receiving an input wave having a fundamental frequency, an intermediate portion for converting said input wave to a wave having a frequency equal to the second harmonic of said fundamental frequency, and an output portion for emitting an output wave having a frequency equal to the second harmonic of said fundamental frequency, said intermediate portion being interposed between said input and output portions of said substrate;

front-periodic and rear-periodic structures formed in the input and output portions of said substrate respectively, said periodic structures having alternating regions of high and low refractive indices along a surface of said substrate; and a second-harmonic wave generating structure formed in the intermediate portion of said substrate, whereby waves having a fundamental frequency entering said second-harmonic generating structure are confined between said front-periodic and rear-periodic structures.

2. The second-harmonic wave generating element according to claim 1, wherein the alternating regions of said front-periodic and rear-periodic structures include first portions of the high optical refractive index formed by the introduction of a material into said ferroelectric crystal substrate, said introduced material being different than that of the substrate;

a period $\Lambda_i$ of the front-periodic structure has a value satisfying the following equation (1);

a period $\Lambda_o$ of the rear-periodic structure has a value satisfying the following equation (2), $$\Lambda_i = \frac{1}{2} \frac{\lambda}{n(\omega)} (k_1 + 1)$$
$$= \frac{1}{2} \frac{\lambda}{2n(2\omega)} (k_2 + 1) \quad (1)$$

$$\Lambda_o = \frac{1}{2} \frac{\lambda}{n(\omega)} (m_1 + 1)$$
$$= \frac{1}{2} \frac{\lambda}{4n(2\omega)} (2m_2 + 1) \quad (2)$$

wherein, $\lambda$ represents a wavelength of the fundamental wave in a vacuum; $k_1$, $k_2$, $m_1$ and $m_2$, respectively represent zero or a positive integer; $n(\omega)$ represents a refractive index of the front-and rear-periodic structures with reference to the fundamental wave; and $n(2\omega)$ represents a refractive index of the periodic structures with reference to the second-harmonic wave.

3. The second-harmonic wave generating element according to claim 1, wherein the front-and rear-periodic structures comprise optical waveguides, respectively, each of the optical waveguides being provided with first alternating regions of the high optical refractive index formed by the introduction of a material different than that of said substrate to a first thickness $d_1$ into said ferroelectric crystal substrate and second alternating regions of the low optical refractive index formed by an introduction of the different kind of material to a second thickness $d_2$ into said ferroelectric crystal substrate where the first thickness $d_1$ is greater than the second thickness $d_2$;

the period $\Lambda_i$ of the front-periodic structure has a value satisfying the following equation (A), and the period $\Lambda_o$ of the rear-periodic structure has a value satisfying the following equation (B), $$\Lambda_i = \frac{\lambda(k_1 + 1)}{(n(\omega)\text{eff}(d_1) + n(\omega)\text{eff}(d_2))}$$
$$= \frac{1}{2} \frac{\lambda(k_2 + 1)}{(n(2\omega)\text{eff}(d_1) + n(2\omega)\text{eff}(d_2))} \quad (A)$$

$$\Lambda_o = \frac{\lambda(m_1 + 1)}{(n(\omega)\text{eff}(d_1) + n(\omega)\text{eff}(d_2))}$$
$$= \frac{1}{4} \frac{\lambda(2m_2 + 1)}{(n(2\omega)\text{eff}(d_1) + n(2\omega)\text{eff}(d_2))} \quad (B)$$

wherein, $\lambda$ is a wavelength of the fundamental wave in a vacuum; $k_1$, $k_2$, $m_1$ and $m_2$, respectively are zero or a positive integer; $n(\omega)\text{eff}(d_1)$ is an effective refractive index, with reference to the fundamental wave, of the first alternating region of the first thickness $d_1$; $n(\omega)\text{eff}(d_2)$ is an effective refractive index, with reference to the fundamental wave, of the second alternating region of the second thickness $d_2$; $n(2\omega)\text{eff}(d_1)$ is an effective refractive index, with reference to the second-harmonic wave, of the first alternating region of the first thickness $d_1$; and $n(2\omega)\text{eff}(d_2)$ is an effective refractive index with reference to the second-harmonic wave of the second alternating region of the second thickness $d_2$.

4. The second-harmonic wave generating element according to claim 1, wherein said second-harmonic wave generating structure has a nonlinear optical coefficient with a sign that is periodically reversed, and satisfies a quasi-phase-matching condition.

5. The second-harmonic wave generating element according to claim 2, wherein said second-harmonic wave generating structure has a nonlinear optical coefficient with a sign which is periodically reversed, satisfies a quasi-phase-matching condition.

6. The second-harmonic wave generating element according to claim 3, wherein said second-harmonic wave generating structure has a nonlinear optical coefficient with a sign which is periodically reversed, and satisfies a quasi-phase-matching condition.

7. A second-harmonic wave generating element comprising:

a ferroelectric crystal substrate having a fundamental wave incident side and a wave emitting side;

a second-harmonic wave generating means formed in a region of said substrate, for generating a second-harmonic wave of an incident fundamental wave;

a front-periodic structure formed in a region of said substrate on the fundamental wave incident side and for receiving fundamental waves;

a rear-periodic structure formed in a region of said substrate on the wave emitting side and for emitting generated second harmonic waves, said second-harmonic generating means being disposed between said front-periodic and rear-periodic structures; wherein the front-periodic structure and the rear-periodic structure each have first portions of a high optical refractive index and second portions of a low refractive index, said first and second portions of each structure being periodically and reciprocally arranged so that fundamental waves entering said second-harmonic generating means are confined between said front-periodic and rear-periodic structures.

8. A second-harmonic wave generating element according to claim 7, wherein said ferroelectric crystal substrate is a LiNbO$_3$ substrate, said first portions of the high optical refractive index comprise titanium diffused regions of said substrate, and said second portions comprise non-titanium diffused regions of said substrate.

9. A second-harmonic wave generating element according to claim 7, wherein said front-periodic and rear-periodic structures both have an optical waveguide extending along the wave propagating direction of said substrate and each optical waveguide is provided with said first and second portions of the respective periodic structure, the first and second portions being composed of a different kind of material than the substrate, the first and second portions being of two different thicknesses.

10. A second-harmonic wave generating element according to claim 8, wherein a periodic $\Lambda_i$ of the high and low optical refractive indices of the front-periodic structure has a value satisfying the following equation (1):

$$\begin{aligned} \Lambda_i &= \frac{1}{2} \frac{\lambda}{n(\omega)} (k_1 + 1) \\ &= \frac{1}{2} \frac{\lambda}{2n(2\omega)} (k_2 + 1) \end{aligned} \quad (1)$$

a period $\Lambda_o$ of the high and low refractive indices of the rear-periodic structure has a value satisfying the following equation (2):

$$\begin{aligned} \Lambda_o &= \frac{1}{2} \frac{\lambda}{n(\omega)} (m_1 + 1) \\ &= \frac{1}{2} \frac{\lambda}{4n(2\omega)} (2m_2 + 1) \end{aligned} \quad (2)$$

wherein, $\lambda$ represents a wavelength of the fundamental wave in a vacuum; $k_1$, $k_2$, $m_1$ and $m_2$, respectively represent zero or a positive integer; $n(\omega)$ represents a refractive index of the front-and rear-periodic structures with reference to the fundamental wave; and $n(2\omega)$ represents a refractive index of the periodic structures with reference to the second-harmonic wave.

11. A second-harmonic wave generating element according to claim 9, wherein the period $\Lambda_i$ of the front-periodic structure has a value satisfying the following equation (A), and the period $\Lambda_o$ of the rear-periodic structure has a value satisfying the following equation (B), $$\begin{aligned} \Lambda_i &= \frac{\lambda(k_1 + 1)}{(n(\omega)\text{eff}(d_1) + n(\omega)\text{eff}(d_2))} \\ &= \frac{1}{2} \frac{\lambda(k_2 + 1)}{(n(2\omega)\text{eff}(d_1) + n(2\omega)\text{eff}(d_2))} \end{aligned} \quad (A)$$

$$\begin{aligned} \Lambda_o &= \frac{\lambda(m_1 + 1)}{(n(\omega)\text{eff}(d_1) + n(\omega)\text{eff}(d_2))} \\ &= \frac{1}{4} \frac{\lambda(2m_2 + 1)}{(n(2\omega)\text{eff}(d_1) + n(2\omega)\text{eff}(d_2))} \end{aligned} \quad (B)$$

wherein, $\lambda$ is a wavelength of the fundamental wave in a vacuum; $k_1$, $k_2$, $m_1$ and $m_2$, respectively are zero or a positive integer; $n(\omega)\text{eff}(d_1)$ is an effective refractive index, with reference to the fundamental wave, of the first portion of a first thickness $d_1$; $n(\omega)\text{eff}(d_2)$ is an effective refractive index, with reference to the fundamental wave, of the second portion of a second thickness $d_2$; $n(2\omega)\text{eff}(d_1)$ is an effective refractive index, with reference to the second-harmonic wave, of the first portion of the first thickness $d_1$; and $n(2\omega)\text{eff}(d_2)$ is an effective refractive index, with reference to the second-harmonic wave, of the second portion of the second thickness $d_2$.

12. A second-harmonic wave generating element according to claim 7, wherein said second harmonic generating means has a nonlinear coefficient with a sign that is periodically reversed, and satisfies a quasi-phase-matching condition.

13. A second-harmonic wave generating element according to claim 10, wherein said second harmonic generating means has a nonlinear coefficient with a sign that is periodically reversed, and satisfies a quasi-phase-matching condition.

14. A second-harmonic wave generating element according to claim 11, wherein said second harmonic generating means has a nonlinear coefficient with a sign that is periodically reversed, and satisfies a quasi-phase-matching condition.

* * * * *